Oct. 23, 1945.     B. A. McDERMOTT     2,387,455
INFLATING VALVE FOR HOLLOW ARTICLES
Filed July 16, 1945

INVENTOR.
Bernard A. McDermott
BY
William Cleland
Attorney

Patented Oct. 23, 1945

2,387,455

UNITED STATES PATENT OFFICE 2,387,455

INFLATING VALVE FOR HOLLOW ARTICLES

Bernard A. McDermott, Akron, Ohio, assignor to The Sun Rubber Company, Barberton, Ohio, a corporation of Ohio Application July 16, 1945, Serial No. 605,205

15 Claims. (Cl. 273—65)

This invention relates to inflation valves for athletic balls such as basketballs, volleyballs, footballs, or for other hollow inflatable articles.

In the past there have been provided satisfactory inflation valves for athletic balls, including a hollow stem portion having therein a filler of self-sealing material and a releasable cap for retaining the filler in the stem, the balls being inflatable by means of an inflation needle inserted through the valve in known manner. Certain difficulties, however, have arisen with respect to such valves. For example, it has been found particularly in the manufacturing processes that frequently an excess amount or non-uniform placement of the self-sealing material in the valve stem will prevent secure seating of the releasable cap. It has also been found that occasionally when a ball is being inflated to a relatively high pressure for certain purposes, that if the inflation needle is for some reason not completely inserted through the valve when pressure is applied the inner end of the valve stem may be blown off, which of course results in the article being irreparably damaged.

A general object of this invention is to provide an inflation valve of the character described in which the above difficulties are overcome, and at the same time providing a valve construction which is relatively simple to assemble in production or otherwise.

Another object of the invention is to provide a valve of the character described having means incorporated therein for preventing an inflation needle inserted therethrough from pushing the self-sealing material from the valve into the interior of the inflatable article, and thereby preventing depletion of the supply of said material.

Another object of the invention is to provide in a valve of the character described in which the assembly of the self-sealing device thereof is greatly facilitated.

Still another object of the invention is to provide a valve construction of the character described having improved means to facilitate proper insertion of an inflation needle therethrough.

Other objects of the invention will be manifest from the following brief description and the accompanying drawing.

Figure 1:
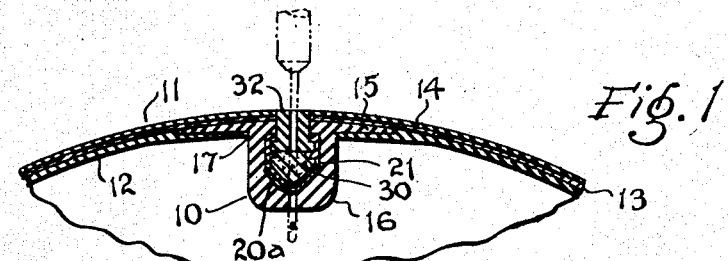
Figure 1 is a fragmentary cross-section through a valve embodying the invention incorporated in an inflatable athletic ball.
Figure 2:
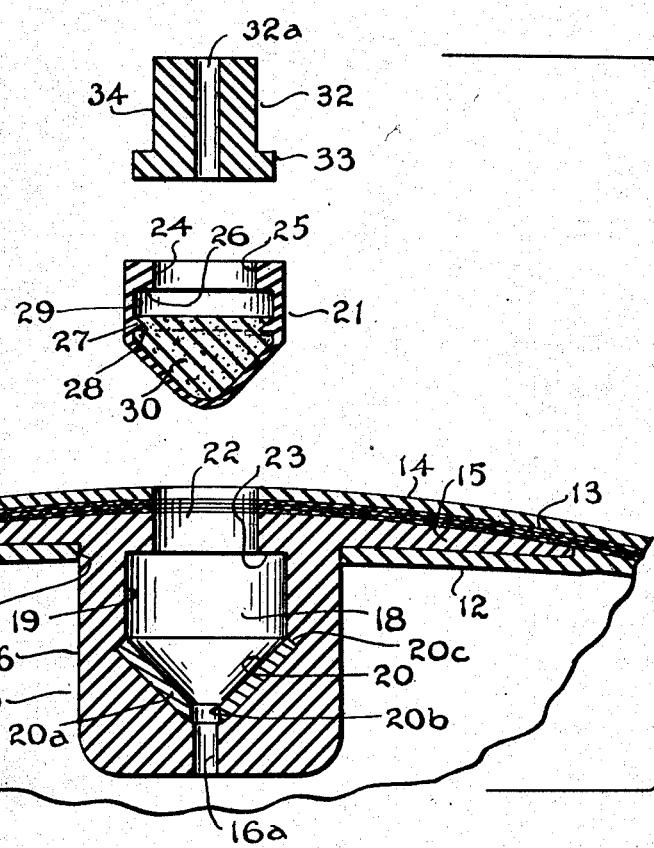
Figure 2 is an explosion view of the same, on an enlarged scale.

Referring to Figures 1 and 2 of the drawing, the numeral 10 designates an inflating valve incorporated in a hollow, fabric reinforced athletic ball 11. The ball illustrated includes a rubber bladder 12, a casing 13 comprising three layers of rubberized fabric, and an outer abrasion-resisting cover 14 of rubber or leather, all bonded or vulcanized together in known manner.

The valve 10 may be formed of vulcanized rubber to provide a relatively large and relatively thin, tapered base portion 15, of circular or orvate shape, and from which extends an integral hollow stem 16. The inner surface of the base 15 is preferably cured to the outer surface of bladder 12, before casing 13 has been applied thereto, with the stem 16 extended inwardly of the ball through an aperture 17 in the bladder. The cavity 18 of the stem is formed with a cylindrical portion 19 and an inwardly tapered portion 20, for snugly receiving a similarly tapered self-sealing plug or insert 21 (see Figure 1). An aperture 22, slightly smaller in diameter than cylindrical portion 19, is provided in the outer portion of the valve for insertion of plug 21 and to provide an annular shoulder 23 for engagement by the outer edge of the plug when received in cavity 18. The ball casing 13 and cover 14 are provided with apertures corresponding to aperture 22 in the valve stem. A small inflation needle receiving aperture 16a is provided at the inner end of stem 16 in alignment with aperture 22 thereof.

The plug 21 may comprise a casing of rubber or like resilient material having a self-sealing device therein, the casing being provided with an aperture 24 of substantially the same diameter as aperture 22 of the valve stem, to provide an annular shoulder 26. Inwardly spaced from shoulder 26 is a tapered annular rib 27 providing a shoulder 28. As best shown in Figure 2, the self-sealing device may be provided by the inner or tapered end of the plug casing being filled with a gob or filler 30 of non-vulcanizable raw rubber, or other self-sealing material, such as soft vulcanized rubber, rubber cement, etc., substantially to the annular rib 27, as shown in Figure 2, thereby providing a cylindrical cavity portion 29 between shoulder 26 and rib 27. The rib 27 serves to anchor the filler 30 in position in the plug.

A relatively thin conical or concavo-convex washer or insert 20a of metal or similar stiff material may be provided at the tapered end of the cavity. The tapered end of washer 20a is apertured at 20b to correspond to the needle aperture 16a of stem 16. Although the needle apertures in the rubber parts of the valve herein may be slightly smaller in diameter than the inflation needle, aperture 20b is of diameter proximating the diameter of the standard inflation needle so that as the latter is pierced inwardly through the valve it will be subjected to a wiping action by the edge of the aperture 20b, which effectively prevents the self-sealing material 30 from being pushed out of the valve through expandible stem aperture 16a, into the interior of the ball with successive insertions of said needle, which might otherwise fully deplete the sealant from the valve. For securing the washer 20a in position in the stem 16 the tapered end of the cavity thereof may be recessed as shown to provide an annular shoulder 20c for yielding engagement by the annular outer edge of the washer (see Figure 2).

If necessary, to provide an effective pressure-fluid seal between the self-sealing material 30 and the inner wall surface of the plug the self-sealing material may be cemented in place. The plug similarly may be cemented in place to insure against leakage of pressure-fluid from the ball.

For removably and replaceably retaining or sealing the self-sealing material 30 in plug 21, there may be provided a cap 32 of rubber or other suitable material. This cap is provided with an enlarged part 33 snugly receivable in cavity portion 29 of the plug, and a reduced part 34 for fitting in the aperture 22 of the valve stem and the corresponding apertures of casing 13 and cover 11. Thus the cap is adapted to be firmly but releasably secured in position by locking engagement of enlarged part 33 in cylindrical recess 29, between the shoulder 26 and rib 27 or the surface of the filler 30. As the enlarged part 33 of cap 32 is only slightly greater in diameter than the valve aperture 22 the cap is readily insertable or removable from the valve. The plug 21 is similarly insertable or removable.

The cap 32 is provided with a small aperture 32a therethrough, to be in alignment with the aperture 16a in the valve stem (see Figure 2), so that an inflation needle of known type attached to a source of pressure-fluid supply is insertable through the cap, plug 21 and the self-sealing material therein, the washer aperture 20b and the stem aperture 16a, the needle of course puncturing the tapered end of plug 21 the first time it is pierced, the wall of the plug being made relatively thin for that purpose. If desired a small aperture may be provided in the tapered end of the plug when it is manufactured. The tapered construction of the plug, washer and valve stem cavity will materially aid in correctly guiding the inflation needle to the stem aperture 16a. The cap 32 also may be cemented in place if desired.

In assembling the valve parts, particularly during the manufacturing process, the plug 21 with the filler material 30 therein may first be inserted in valve stem cavity 18 and the sealing and retaining cap 32 thereafter applied as previously described, or the plug may be inserted in the cavity, after which the gob or filler of self-sealing material 30 is inserted in the plug and the cap 32 applied as before, or the plug, sealing material, and cap, assembled as a unit, may be forced into position in the valve. Insertion of the plug and cap as a unit is particularly desirable in the manufacturing assembly of athletic balls, because faulty units may be rejected before they can be inserted in a ball. In each instance the positioning of the parts is aided by the inherent yielding resiliency or elasticity of the rubber thereof.

The walls of the valve stem 16 are made relatively thick, as shown, to resist substantial inflation pressures should such be applied while the outlet end of an inflation needle is still within the plug 21, so that the valve will not thereby be damaged.

In the use of the above described valve in a hollow athletic ball (Figure 1) for inflating the same, the needle of an inflating device is pierced through aperture 32a of cap 32, through plug 21 and the self-sealing material 30 therein, and aperture 16a of valve stem 16, to project an apertured end of the needle freely into the ball interior. The needle is similarly inserted for deflating purposes. When the needle is withdrawn from the valve the puncture made through the filler 30 will be immediately self-sealed due to the nature of the material thereof. Washer 20a effectively prevents depletion of the sealant 30 in the manner previously described.

Should the filler 30 lose its self-sealing properties after repeated insertions of inflation needles through the valve the cap 32 may be readily removed by means of a pointed instrument inserted in aperture 32a thereof, after which a new filler 30 may be inserted in the plug 21, or the plug itself may be replaced with a new one, or a complete new plug and cap unit may be assembled in the valve stem. Should new valve parts not be available, a quick repair is possible by filling the plug 21 with rubber cement or other handy self-sealing material and replacing the cap 32.

Figure 3:
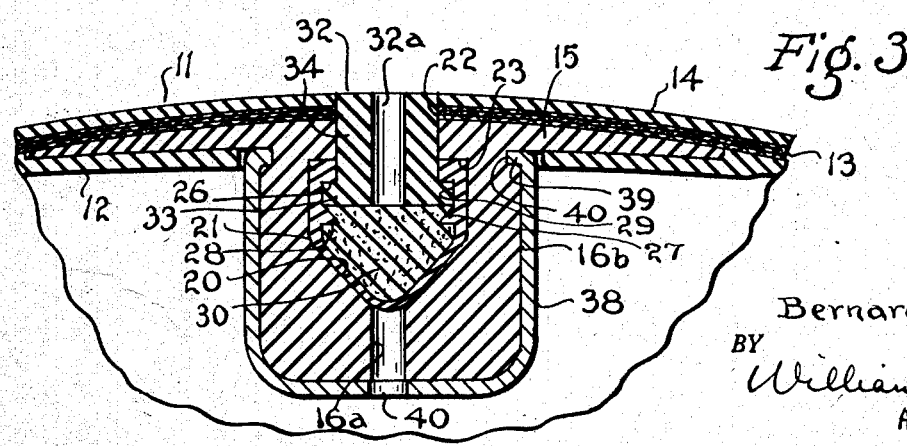
Figure 3 is a view similar to Figure 1, on a larger scale, illustrating a modified form of the invention.

Referring to Figure 3, there is shown a modified form of inflating valve incorporated in a hollow athletic ball. This valve is the same in substantially all respects to that illustrated in Figures 1 and 2, like parts therefore being given like numbers, except that there is provided around the valve stem 16b a cup-shaped casing 38 of metal or other relatively hard material adapted to withstand substantially high inflation pressure applied within the valve plug 21, should such pressure be accidentally applied while an inflation needle is partially inserted as previously described with the inflation aperture thereof within plug 21. The casing 38 may be retained in snug relation about the stem 16b, for example, by means of an in-turned annular flange 39 engaging in an annular groove 40 provided in the stem adjacent the juncture thereof with base portion 15. An aperture 41 is provided in casing 38 in cooperation with the valve stem aperture 16a for receiving an inflation needle therethrough. The aperture 41 may be substantially the same diameter as the inflation needle, to provide a wiping action for preventing loss of the self-sealing material to the interior of the ball, somewhat in the manner described in connection with washer or insert 20a. The construction, assembly and use of this form of the invention is otherwise as previously described.

Other modifications of the invention may be resorted to without departing from the spirit thereof or the scope of the appended claims.

What is claimed is:

1. A valve for inflatable articles, comprising a stem having a cavity therein, said stem having apertures at inner and outer ends thereof communicating with said cavity, a self-sealing plug receivable in said cavity through said outer aperture, a cap receivable in said outer aperture, and interconnecting means on said cap, stem and plug for securing the cap and plug in the stem.

2. A valve for inflatable articles, comprising a stem having a cavity therein, said stem having apertures at inner and outer ends thereof communicating with said cavity, a self-sealing plug receivable in said cavity through said outer aperture, a cap receivable in said outer aperture, and means for releasably securing the cap in the stem to retain the plug therein, said plug including a casing having therein a filling of self-sealing material.

3. A valve for inflatable articles, comprising a stem of rubber or like resilient material and having a cavity therein, said stem having apertures at inner and outer ends thereof communicating with said cavity, a plug including a casing of rubber or like resilient material receivable in said cavity, a cap receivable in said outer aperture, and means for releasably securing said cap in position in said stem, said plug casing having a filling therein of self-sealing material.

4. A valve for inflatable articles, comprising a stem having a cavity therein, said stem having apertures at inner and outer ends thereof communicating with said cavity, a plug including a casing containing self-sealing material, said plug being receivable in said cavity through said outer aperture, a cap receivable in said outer aperture, and interengaging means on said cap and on said plug for releasably retaining said cap and plug in position in said stem.

5. A valve for inflatable articles, comprising a stem of relatively hard rubber or like material and having a cavity therein, said stem having apertures at inner and outer ends thereof communicating with said cavity, a plug of relatively soft self-sealing material receivable in said cavity through said outer aperture, a cap receivable in said outer aperture, and means for releasably securing said cap in position in said stem, said cavity and said plug being correspondingly tapered toward said inner aperture of the stem for guiding an inflating needle through said inner aperture.

6. A valve for inflatable articles, comprising a stem having a cavity therein, said stem having apertures at inner and outer ends thereof communicating with said cavity, said outer aperture providing an inwardly presented shoulder in said cavity, a plug receivable in said cavity with the outer edge thereof against said shoulder, said plug being adapted to receive an inflating stem therethrough and including a self-sealing device, said plug having a recess at the outer end thereof and providing an annular inwardly presented shoulder, and a cap receivable in said outer aperture of the valve stem and provided with an annular member for engaging said annular shoulder of said plug.

7. A valve for inflatable articles, comprising a stem of rubber or like resilient material and having a cavity therein, said stem having apertures at inner and outer ends thereof communicating with said cavity, a plug receivable in said cavity, said plug being adapted to receive an inflating stem therethrough and including a self-sealing device, means for releasably securing said plug in position in said valve stem, and a reinforcing casing around said stem, said reinforcing casing being of relatively unyielding material adapted to resist substantial expansion of said stem due to pressure in said cavity thereof.

8. A valve for inflatable articles, comprising a stem of rubber or like resilient material and having a cavity therein, said stem having apertures at inner and outer ends thereof communicating with said cavity, a plug receivable in said cavity, said plug being adapted to receive an inflating stem and including a self-sealing device, a cap receivable in said outer aperture, means for releasably securing said cap and plug in position in said valve stem, and a casing of reinforcing material around said stem to resist substantial expansion thereof due to pressure in said stem cavity.

9. A valve for inflatable articles comprising a body of rubber or like resilient material and having a cavity therein, a filler of self-sealing material in said cavity, said body having substantially aligned apertures at outer and inner ends thereof for receiving an inflation needle pierced through the valve, and an apertured insert of relatively stiff material in said body adjacent said inner end, the aperture of said insert providing an edge portion for wiping engagement with an inflation needle pierced through the valve.

10. A valve for inflatable articles comprising a body of rubber or like resilient material and having a cavity therein, a filler of self-sealing material in said cavity, said body having substantially aligned apertures at outer and inner ends thereof for receiving an inflation needle pierced through the valve, and an apertured insert of relatively stiff material in said cavity at the inner end thereof, the aperture of said insert providing an edge portion for wiping engagement with an inflation needle pierced through the valve.

11. A valve for inflatable articles comprising a body of rubber or like resilient material and having a cavity therein, a filler of self-sealing material in said cavity, said body having substantially aligned apertures at outer and inner ends thereof for receiving an inflation needle pierced through the valve, and an inwardly tapered apertured insert of relatively stiff material in said body adjacent said inner end, the aperture of said insert providing an edge portion for wiping engagement with an inflation needle pierced through the valve.

12. A valve for inflatable articles comprising a body having a cavity therein, a filler of self-sealing material in said cavity, said body having substantially aligned apertures at outer and inner ends thereof for receiving an inflation needle pierced through the valve, and an apertured insert of relatively stiff material in said body adjacent said inner end, the aperture of said insert providing an edge portion for wiping engagement with an inflation needle pierced through the valve.

13. A valve for inflatable articles comprising a body of rubber or like elastic or resilient material and having a cavity therein, a filler of self-sealing material in said cavity, said body having substantially aligned apertures at outer and inner ends thereof for receiving an inflation needle pierced through the valve, and an inwardly tapering concavo-convex insert of relatively stiff material in said cavity at the inner end thereof, said body being provided with a shoulder portion within said cavity for retaining said insert in position therein, said insert having an aperture for passage of the inflation needle.

14. A valve for inflatable articles, comprising a stem having a cavity therein, said stem having apertures at inner and outer ends thereof communicating with said cavity, a plug including a casing receivable in said cavity through said outer aperture, a cap receivable in said outer aperture, means for releasably securing said cap in position in said stem, said plug casing having a filling therein of self-sealing material, and an insert of relatively stiff material in said stem adjacent the inner end of said cavity, said insert having an aperture proximating the diameter of an inflation needle to provide a wiping action thereon upon the same being pierced through the valve.

15. A valve for inflatable articles, comprising a stem having a cavity therein, said stem having apertures at inner and outer ends thereof communicating with said cavity, a plug including a casing receivable in said cavity through said outer aperture, a cap receivable in said outer aperture, means for releasably securing said cap in position in said stem, said plug casing having a filling therein of self-sealing material, and a concavo-convex insert of relatively stiff material in said stem adjacent the inner end of said cavity, said insert tapering inwardly and having an aperture proximating the diameter of an inflation needle to provide a wiping action thereon upon the same being pierced through the valve.

BERNARD A. McDERMOTT.